March 6, 1962  J. B. GODSHALK  3,023,770
POULTRY WATERING DEVICES
Filed Nov. 6, 1958
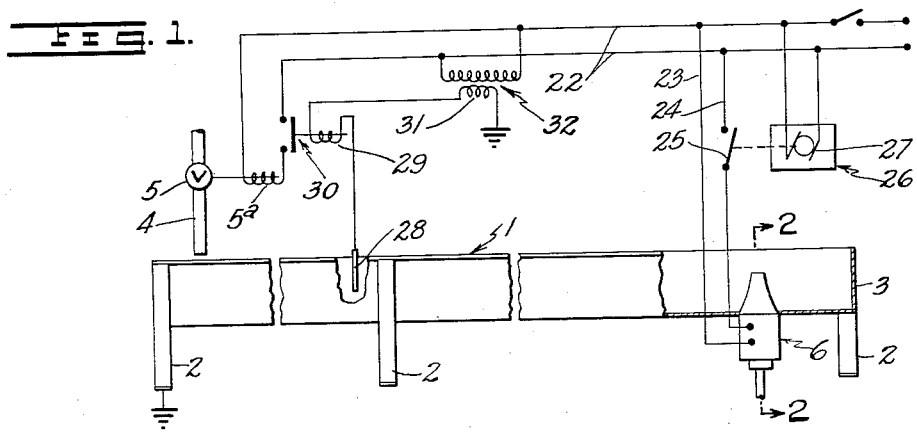
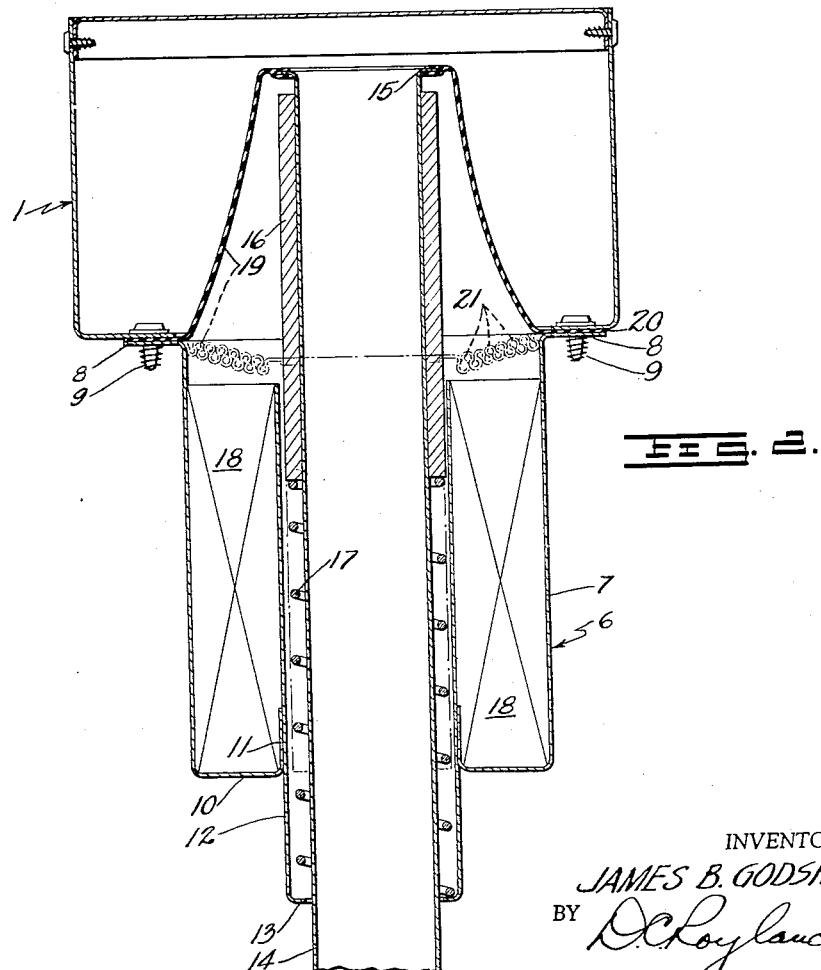
INVENTOR.
JAMES B. GODSHALK
BY D. C. Roylance
ATTORNEY 3,023,770
POULTRY WATERING DEVICES
James B. Godshalk, West Pikeland Township, Chester County, Pa., assignor to Fox Products Company, Philadelphia, Pa., a corporation of Pennsylvania
Filed Nov. 6, 1958, Ser. No. 772,213
10 Claims. (Cl. 137—391)

This invention relates to poultry watering devices, such as automatic poultry watering troughs, and to drain and filling features thereof.

In the raising of chickens, turkeys, etc., it is now the common practice to employ automatic watering devices including a trough or similar container which is supplied with water via an automatically operated valve to maintain the water at a predetermined level. While such devices are widely used with considerable success, they have the drawback that the trough or other container must be periodically cleaned manually to remove ordinary dirt, drippings, and such other foreign material as may tend to pollute the water and clog the system. To solve this difficulty, it has heretofore been proposed that the water be flowed continually through the trough and thus carry away the dirt and the like. Arrangements to accomplish this have, however, not been satisfactory on a commercial basis because of the tendency for the necessary drain equipment to become clogged so that the troughs overflowed. Further, such arrangements rather drastically increase the water consumption and are therefore uneconomical.

An object of the present invention is to provide an improved poultry watering device having means whereby the trough or other watering container is periodically drained in such fashion as to rapidly flush out the same and therefore accomplish satisfactory cleaning.

Another object is to provide an improved automatic drain mechanism for poultry watering troughs and the like.

A further object is to devise an improved drain mechanism which obviates the necessity for employing an outflow valve of the type comprising a movable valve element working in combination with a seat.

Yet another object is to provide certain valuable improvements in poultry watering equipment which are particularly applicable to situations where very long watering troughs are employed.

A further object is to devise an improved drain mechanism which obviates the necessity for employing an outflow valve of the type comprising a movable valve element working in combination with a seat.

Yet another object is to provide certain valuable improvements in poultry watering equipment which are particularly applicable to situations where very long watering troughs are employed.

A further object is to devise a novel, automatic drain system for poultry watering devices which is substantially completely free from any tendency to jam or to become clogged.

In order that the manner in which these and other objects are accomplished in accordance with the invention can be understood in detail, reference is had to the accompanying drawings, which form a part of this specification, and wherein:

FIG. 1 is a view, partly in side elevation with some parts broken away for clarity, and partly diagrammatic, of one embodiment of the invention; and FIG. 2 is a vertical sectional view, taken on line 2—2, FIG. 1, and illustrating the automatic drain valve of the device of that figure in de-energized condition.

Referring now to the drawings in detail, and first to FIG. 1 thereof, it will be seen that the embodiment of the invention here illustrated comprises an elongated, substantially rigid poultry watering trough 1 fabricated from sheet metal and having a generally U-shaped transverse cross-section. Such a trough may be extremely long, as on the order of 100 feet, and is rigidly supported on the floor of the poultry house by means of suitable leg members 2. The trough 1 is, of course, closed at both ends in the usual fashion by end walls, as seen at 3.

Adjacent one end, there is provided a filling device comprising a filling pipe 4 in which is connected a normally closed solenoid actuated valve 5 via which water may be supplied from any suitable source to the trough.

At the opposite end of the trough, the bottom wall thereof is provided with a circular opening at which is mounted an automatic drain device indicated generally at 6. As seen in FIG. 2, the drain device 6 comprises a generally cylindrical, tubular housing 7 having at its top an outwardly directed flange 8 secured to the lower surface of the bottom wall of the trough, as by sheet metal screws 9, so as to be concentric with the drain opening in the bottom of the trough. At its bottom end, the housing 7 is provided with an inturned end flange 10 and a tubular, upwardly directed sleeve portion 11 concentrically disposed inwardly of the main wall of housing 7. Secured to portion 11 in any suitable fashion, as by silver soldering, and extending coaxially with respect to housing 7, is a guide tube 12. Tube 12 extends almost to the top of housing 7 and there terminates in an open end. Tube 12 also extends below bottom end wall 10 of housing 7 and there terminates in an inturned flange 13. Slidably disposed concentrically within guide tube 12 is a metal drain tube 14 terminating at its top end in an outwardly directed annular flange 15. Embracing a major portion of drain tube 14 is a magnetic sleeve 16, of a material such as soft iron, which is fixed to the drain tube, as by silver soldering. Sleeve 16 is of considerable thickness and therefore projects outwardly from drain tube 14. A biasing spring 17 is disposed between the lower end of sleeve 16 and the bottom end flange 13 of guide tube 12. Thus, spring 17 acts under compression between flange 13 and the bottom end of sleeve 16, so biasing drain tube 14 upwardly.

Disposed within the annular space between housing 7 and guide sleeve 12 is an electromagnetic actuating winding 18 which, as will be explained hereinafter, is effective to actuate the drain valve from an upper, closed position, to which the same is biased by spring 17, seen in solid lines in FIG. 2, and a lower, open position, as indicated by phantom lines in FIG. 2.

The annular space between the upper end of drain tube 14 and the bottom wall of the trough is closed by means of an annular, flexible diaphragm 19 having an outer peripheral portion 20 clamped in fluid-tight relation between top end flange 8 of housing 7 and the lower surface of the bottom wall of the trough by the action of sheet metal screws 9. The inner periphery of diaphragm 19 is provided with a continuous slit and the upper end flange 15 of drain tube 14 is disposed within such slit and bonded to the material of the diaphragm in fluid-tight relation. The diaphragm 19 is so made, that, when the same is in its relaxed or "normal" position, the main body thereof is disposed in the form of a plurality of concentric, annular folds or corrugations, as indicated at 21. The material from which diaphragm 19 is fabricated is such that, when drain tube 14 is actuated to its uppermost position by spring 17 the folds or corrugations 21 are straightened out and the diaphragm is thus stretched into what may be termed a generally frustro-conical form. When the winding 18 is energized and the device is actuated to the position shown in phantom lines in FIG. 2, the corrugations or folds 21 return, as illustrated. The diaphragm can be of rubber- or resin-impregnated fabric sheet material.

Spring 17 is so designed that, when allowed to extend to its normal or relaxed condition, it is effective to raise elements 14 and 16 to such an extent that the open upper end, at 15, of the drain tube 14 is disposed a considerable distance above the bottom wall of trough 1 and just above the level at which water is to be maintained in the trough. The upper, closed position of drain tube 14 can be predetermined by having spring 17 of such strength that diaphragm 19 becomes fully extended and taut, so that the diaphragm constitutes a limit stop acting against the spring force. On the other hand, the arrangement can be made such that spring 17 simply is allowed to relax fully, thus raising the drain tube by a definite distance equal to the difference between the relaxed and compressed lengths of the spring, in which case diaphragm 19 need not be extended to taut condition.

Spring 17 is compressible to such an extent that the drain tube 14 can be lowered, as a result of action of the actuating winding agent 18, to a position where the open upper end 15 thereof is disposed just below the bottom wall of trough 1. With the drain tube in this position, it is obvious that all of the water within the trough will be abruptly drained therefrom via the drain tube 14 and can pass into a suitable receptacle (not shown) or directly to the sewer.

As seen in phantom lines in FIG. 2, the lowermost position of the drain tube 14 is advantageously such that the open top or entry end thereof is disposed just below the bottom wall of the trough. When the drain tube is in this position, the diaphragm 19 defines a conical sump through which the water rushes into the drain tube during the rapid draining action. Such an arrangement assures that particles of dirt and the like will be carried forcefully into the drain tube.

In many instances, in order to obtain satisfactory draining and cleaning of the trough, it is only necessary that, in its lowermost position, the top of drain tube 14 be disposed substantially at the bottom of the trough. Particularly where troughs of relatively large capacity are employed, the force of the water passing into the drain tube is such that the dirt and debris will be carried into the drain tube even though the top thereof is disposed slightly above the bottom wall of the trough.

While it is advantageous to employ a construction, as seen in FIG. 2, such that energization of the electromagnetic actuating means causes the drain tube to move downwardly, against the biasing action of spring 17, the opposite situation may pertain. That is, the actuating force of the electromagnetic means may be employed to raise the drain tube to its effectively closed position and to maintain the same in that position. This involves, of course, a reversal of the electromagnetic design of the actuator. While such an arrangement is sometimes less desirable than that of FIG. 2, since it is necessary to maintain the actuating winding in energized condition so long as the trough is in use, except for periods of draining thereof, one advantage does arise from this change. That is the fact that the biasing spring 17 may be eliminated, the drain tube being returned to its lower, open position simply by the action of gravity. Such a gravity return action can be made quite abrupt since the combined weight of the drain tube and the magnetic member 16 is considerable and since the diaphragm 19 applies only a negligible restraining force, if any, to the drain tube assembly. Also, there is of course a distinct hydraulic head on the drain device when the trough is full.

Both the actuating coil 18 of the automatic drain assembly and the actuating coil 5a of filling valve 5 can be energized from the same power source, as indicated in FIG. 1. Thus, supply conductors 22 are connected to a suitable source of alternating current, on the one hand, and to the terminals of actuating winding 5a, on the other, the terminals of actuating winding 18 of the drain device being connected across conductors 22 via conductors 23 and 24. In conductor 24, in series with actuating winding 18, there is provided a control switch 25 of conventional form, the switch 25 being periodically actuated by a conventional time clock mechanism indicated diagrammatically at 26 and comprising an electric motor 27 connected across conductors 22. The time clock 26 and switch 25 can be constructed and addjusted in such manner that actuating winding 18 of the drain device of FIG. 2 is energized for a predetermined period one or more times during each 24 hours. Thus, draining and cleaning of the trough 1 is acomplished automatically without requiring attention of the operator.

In order to control the filling valve 5, the apparatus comprises a water level sensing electrode 28 connected in series with winding 29 of a relay 30 and secondary winding 31 of a transformer 32, the other terminal of winding 31 being connected to ground and the trough also being grounded, the primary winding of the transformer being connected across supply conductors 22. Thus, so long as the water within trough 1 is at least at a predetermined level, determined by the position of electrode 28, current will flow through the actuating winding 29 of relay 30, causing that relay to be energized. The contacts of relay 30 are connected in series with winding 5a of valve 5 and are so arranged that, when energized, the relay is open, interrupting the flow of current to the winding 5a and so maintaining the valve 5 closed. When the water level in the trough descends to such a point that the sensing electrode 28 is no longer in contact with the water, current no longer flows in winding 29 and relay 30 accordingly closes, being biased to close by a suitable spring. Current thus flows to winding 5a, causing valve 5 to open and supply additional water to the trough.

Throughout most of the operation of the watering device, this action will be effective only to maintain the water in the trough at a desired level. But, at such times as switch 25 is closed to cause the automatic drain device to be moved to its open position, the resulting decrease in the level of water in trough 1 of course causes valve 5 to supply water continuously to the trough. Thus, the action of the automatic drain device is not only to drain the normal amount of water quickly from the trough but also to cause a continuing flow of cleaning water through the trough for such period as switch 25 remains closed. That is, so long as the automatic drain device is in open position, water will be supplied to the trough via valve 5 because sensing electrode 28 is not in contact with water in the trough. During such times, of course, valve 5 will be closed at a time subsequent to the return of the automatic drain device to its upper or effectively closed position, since such actuation of the drain device will result in the trough again being filled to a point where the sensing electrode 28 contacts the water.

I claim:

1. In a watering device, the combination of a container having an opening, a hollow drain member aligned with said opening and having an entry end portion of smaller transverse dimensions than said opening, annular flexible means having its outer peripheral portion sealed to a wall of said container and its inner peripheral portion sealed to said drain member, said flexible means being of sufficient flexibility to allow said drain member freedom of movement between a first position, in which the entry end thereof is positioned above a predetermined level at which water is to be maintained in said container, and a second position substantially below such level, filling means operatively arranged to deliver water to said container, and actuating means operatively connected to said drain member for moving the same abruptly from said first position to said second position.

2. In a watering device, the combination of a receptacle having a bottom wall and side wall means defining a space in which water can be maintained, said bottom wall having an opening therein; a hollow drain member aligned with said opening and depending from said receptacle; an annular flexible member having its outer peripheral portion attached in fluid-tight relation to said bottom wall at said opening and its inner peripheral portion attached in fluid-tight relation to the upper end of said drain member, said flexible member having sufficient flexibility to allow said drain member freedom of movement between an upper position, in which the upper end thereof is disposed above a predetermined level at which water is to be maintained in said receptacle, and a lower position, in which the upper end thereof is spaced below said upper position by a distance at least as great as the distance between said bottom wall and said upper position, resilient means operatively associated with said drain member to bias the same to one of said positions, actuating means operatively connected to said drain member to actuate the same to the other of said positions, and filling means operatively arranged to deliver water to said receptacle.

3. A watering device constructed in accordance with claim 2 and wherein said biasing means is a coil spring and said actuating means is a reciprocatory electromagnetic power device.

4. A watering device constructed in accordance with claim 3 and wherein both said spring and said power device surround said drain member and are disposed below said flexible member, said spring being disposed to bias said drain member to said upper position.

5. A watering device constructed in accordance with claim 2 and further comprising housing means dependently secured to said bottom wall, said drain member extending through said housing means, and both said resilient means and said actuating means being contained within said housing means.

6. In a watering device, the combination of a receptacle having a bottom wall and side wall means defining a space in which water can be maintained, said bottom wall having an opening therein; drain tube means aligned with said opening and extending downwardly from said receptacle; a flexible diaphragm having an outer portion secured in fluid-tight relation to said bottom wall at said opening and an inner peripheral portion secured in fluid-tight relation to the upper end of said drain tube means, said diaphragm having sufficient flexibility to allow said drain tube means freedom of movement between an upper position, in which the top thereof is disposed above a predetermined level at which water is to be maintained in said receptacle, and a lower position, in which the top of the drain tube means is disposed adjacent the plane of said bottom wall at the location of said opening; an electromagnetic actuating winding surrounding said drain tube means below said diaphragm, said drain tube means including a magnetic member operatively positioned with respect to said winding, whereby energization of said winding causes an actuating force to be applied axially to said drain tube means in one direction, resilient means operatively associated with said drain tube means to apply a biasing force to said drain tube means in opposition to said actuating force, and filling means operatively arranged to deliver water to said receptacle.

7. A watering device in accordance with claim 6 and wherein said drain tube means comprises an elongated tube and said magnetic member is a sleeve embracing and fixed to said tube.

8. A watering device in accordance with claim 7 and wherein said resilient means comprises a helical compression spring surrounding said tube and having one end engaged with the lower end of said sleeve, said device including fixed means against which the other end of said spring is seated.

9. In a watering device, the combination of a receptacle having a bottom wall and side wall means defining a space in which water can be maintained, said bottom wall having an opening therein; housing means having an opentop portion secured to said bottom wall and surrounding said opening, said housing means depending from said receptacle and including a tubular guide member aligned with said opening, said housing means defining a closed annular space surrounding said guide member; a drain tube disposed for axial reciprocatory movement within said guide member and having an open top; a flexible annular diaphragm having an outer portion secured in fluid-tight relation to said bottom wall at said opening and an inner peripheral portion secured in fluid-tight relation to the top of said drain tube, said diaphragm being effective to close the space between said drain tube and housing against entry of water from said receptacle and having sufficient flexibility to allow said drain tube freedom of movement between an upper position, in which the top thereof is positioned above a predetermined level at which water is to be maintained in said receptacle, and a lower position, in which the top of the drain tube is disposed below said bottom wall; electromagnetic actuating means operative to move said drain tube in one direction from one of said positions to the other and comprising an electromagnetic winding disposed between said housing means and said guide member and a cooperating magnetic member fixed to said drain tube, a spring connected to said drain tube to bias the same in the opposite direction, and filling means operatively arranged to deliver water to said receptacle.

10. A watering device in accordance with claim 9 and wherein said guide member is provided with an inturned flange, said magnetic member is a sleeve embracing and secured to said drain tube, and said spring is a helical compression spring extending between said flange and said sleeve.

References Cited in the file of this patent

UNITED STATES PATENTS

| | | |
|---|---|---|
| 1,172,584 | Conrad | Feb. 22, 1916 |
| 1,346,898 | Kingsbury | July 20, 1920 |
| 1,854,117 | Devitt | Apr. 12, 1932 |
| 2,050,614 | Kerr | Aug. 11, 1936 |
| 2,471,778 | Ringer | May 31, 1949 |
| 2,608,993 | Andrews | Sept. 2, 1952 |
| 2,626,385 | Schumann | Jan. 20, 1953 |
| 2,652,854 | Stoddard | Sept. 22, 1953 |
| 2,658,520 | Reibein | Nov. 10, 1953 |